United States Patent [19]

Fränkle

[11] Patent Number: 5,651,247
[45] Date of Patent: Jul. 29, 1997

[54] EXHAUST GAS PURIFICATION SYSTEM

[75] Inventor: Gerhard Fränkle, Remshalden, Germany

[73] Assignee: Mercedes-Benz AG, Stuttgart, Germany

[21] Appl. No.: 492,620

[22] Filed: Jun. 20, 1995

[30] Foreign Application Priority Data

Jul. 15, 1994 [DE] Germany ............ 44 25 018.5

[51] Int. Cl.$^6$ ............................................ F01N 3/20
[52] U.S. Cl. ................................. 60/274; 60/286
[58] Field of Search ................ 60/274, 286, 303, 60/301

[56] References Cited

U.S. PATENT DOCUMENTS 5,209,061   5/1993   Takeshima ................ 60/286

FOREIGN PATENT DOCUMENTS

| 0 364 694 | 4/1990 | European Pat. Off. . |
| 0 558 452 | 9/1993 | European Pat. Off. . |
| 1 260 971 | 4/1961 | France . |
| 40 03 515 | 8/1991 | Germany . |
| 42 17 552 | 8/1993 | Germany . |

OTHER PUBLICATIONS

Marine engineers review, "Reducing $No_x$ Emission from Low–Speed Engines", Feb. 1991, pp. 10–14, London GB.

Primary Examiner—Douglas Hart
Attorney, Agent, or Firm—Klaus J. Bach

[57] ABSTRACT

In an exhaust gas purification system for an internal combustion engine, particularly a Diesel engine, which includes an electronic control device for timing the fuel injection into the engine and means for adding a reducing agent stored in a tank to the exhaust gas of the engine for reducing the nitric oxide content of the exhaust gas, means are provided for detecting the fill level of the reducing agent tank and means for retarding the injection timing when the fill level detecting means indicates that the reducing agent tank is empty.

3 Claims, 1 Drawing Sheet

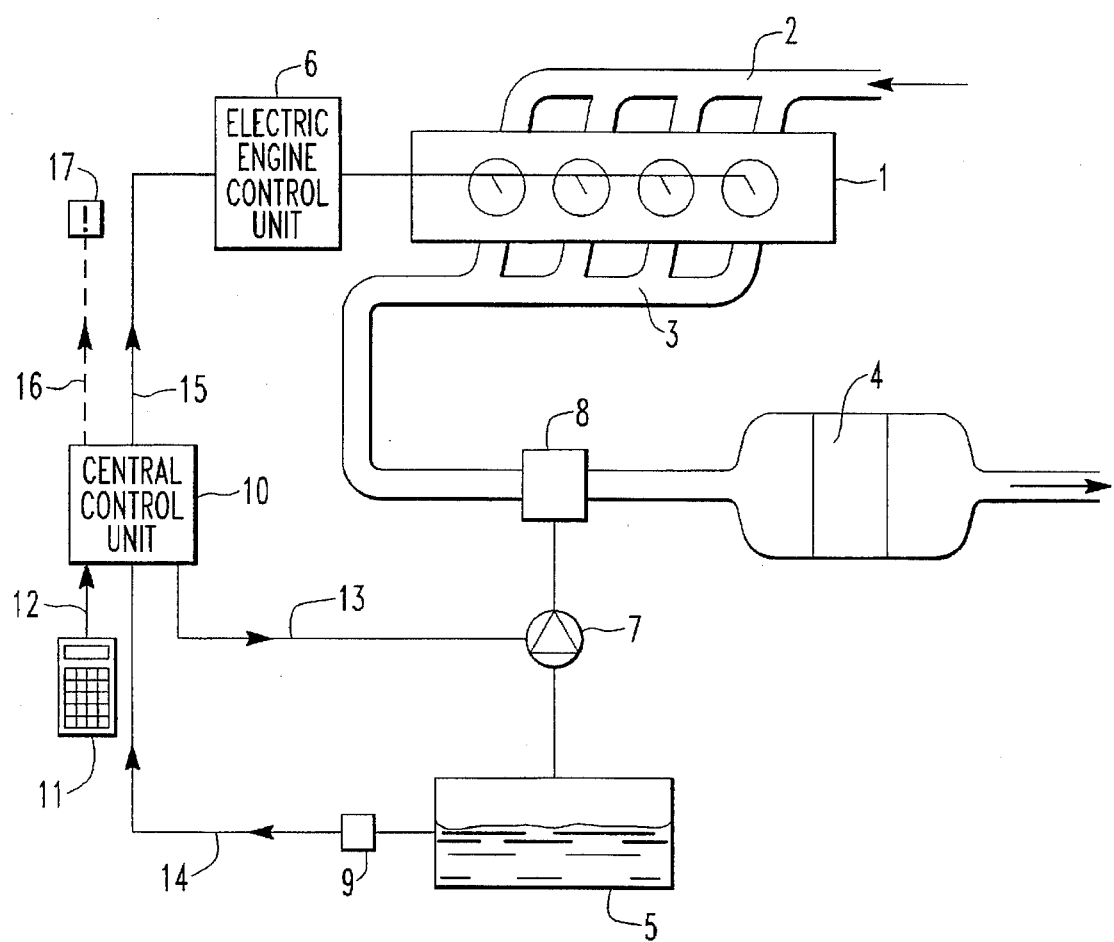

EXHAUST GAS PURIFICATION SYSTEM

BACKGROUND OF THE INVENTION

The invention relates to an exhaust gas purification system for an internal combustion engine, especially a diesel engine, which is controlled electronically and which includes means for the treatment of the engine exhaust gases by the addition of a reducing agent stored in a storage tank.

For a reduction of the nitric oxides in exhaust gases of a vehicle diesel engine, it is known to add ammonia to the exhaust gases upstream of a catalyzer, two ammonia sensors being provided for detecting the charge level limits in the catalyzer (DE 4,217,552 C1). The addition of ammonia from a storage tank is controlled by means of these sensors, with which the ammonia concentration in the catalyzer is measured. The purification of the exhaust gases is carried out by treatment of the exhaust gases with ammonia which is added in the in the needed amounts and which serves as the reducing agent.

It is known from DE 4,003,515 A1 to reduce the nitric oxides content of exhaust gases of a vehicle diesel engine by the addition of urea as a reducing agent. This process is carried out that is the urea is added to the exhaust gases, in the direction of flow of the exhaust gases, upstream of a zeolite-containing catalyzer.

In any case however, at one point, the reducing agent stored in the tank will be consumed whereupon the $NO_2$ content in the engine exhaust gas becomes excessively high.

The object of the invention is to provide an exhaust gas purification system of the type described above, which, however, even in the event of a failure of the exhaust gas treatment arrangement, has no inadmissibly high emissions of nitric oxides.

SUMMARY OF THE INVENTION

In an exhaust gas purification system for an internal combustion engine, particularly a Diesel engine, which includes an electronic control device for timing the fuel injection into the engine and means for adding a reducing agent stored in a tank to the exhaust gas of the engine for reducing the nitric oxide content of the exhaust gas, means are provided for detecting the fill level of the reducing agent tank and means for retarding the injection timing when the fill level detecting means indicates that the reducing agent tank is empty.

Late fuel injection timing reduces the emission of nitric oxides to a great extent, even though the fuel consumption is increased thereby. Although this will lead to the presence of unburned fuel which results in an increased emission of hydrocarbons, the hydrocarbons can nevertheless, be reduced sufficiently by means of the precious metal catalyzers customarily used in diesel engines. Since the fuel injection of a diesel engine is controlled electronically, that is, since the engine is equipped with an electronic injection control device, the engine electronic control can be easily changed so that fuel injection is appropriately delayed when the storage tank is empty. As soon as the driver of the vehicle detects increased fuel consumption, he will refill the storage tank with reducing agent, with the result that the control device changes the engine electronic control back to a normal fuel injection pattern.

In one embodiment of the invention, a visual display for the detection of an empty storage tank is provided. This visual display is expediently located in the region of the dashboard of the motor vehicle, so that the driver of the motor vehicle can quickly detect the need to refill the storage tank.

Further advantages and features of the invention are apparent from the following description of an exemplary embodiment of the invention which is illustrated by means of the drawing.

BRIEF DESCRIPTION OF THE DRAWINGS

The single FIGURE shows an embodiment of an exhaust gas purification system according to the invention which is provided with an exhaust gas treatment arrangement for the reduction of nitric oxides in the exhaust gas.

DESCRIPTION OF A PREFERRED EMBODIMENT

A diesel internal combustion engine 1 as part of a motor vehicle (not shown), has an intake conduit 2. Moreover, the diesel internal combustion engine 1 is provided with an exhaust system 3, which includes a catalyzer 4. Fuel is supplied to the diesel internal combustion engine 1 by an electronic engine control device 6, which provides for a controlled fuel injection.

In order to reduce the concentration of nitric oxides in the exhaust gas stream of the engine, the exhaust gas system 3 includes, in the direction of exhaust gas flow, upstream of the catalyzer 4 an exhaust gas treatment arrangement 5, 7, 8 with a storage tank 5 for storing a reducing agent, which in the exemplary embodiment is urea. Ammonia can also be used as a reducing agent in the same way. The reducing agent is fed from the storage tank 5 by means of a pump 7 to an adding unit 8 which mixes the reducing agent with the exhaust gas stream in the exhaust system 3. The control of the addition of the reducing agent is carried out by means of a control line 13 which is connected to the pump 7 and which extends from a central control unit 10. The delivery of the pump 7 is controlled by the central control unit 10 on the basis of various stored data obtained from a data memory 11 which data are fed to the central control unit 10 by way of a feed line 12.

As soon as it is no longer possible for the pump 7 to supply reducing agent, that is, when the storage tank 5 is empty, the central control unit 10 changes operation of the electronic engine control device 6 so as to retard the injection of fuel into the diesel internal combustion engine 1. This results in a reduced nitric oxide formation within the engine providing for a relatively low emission of nitric oxide, but at the same time, in an increase in the fuel consumption and the emission of particles and of hydrocarbons. To reduce the latter emissions, it is possible to use as a catalyzer 4 a combination of a nitric oxide catalyzer and of a downstream oxidation catalyzer.

In order to guarantee a change over-of the operation of the electronic engine control device 6 from normal fuel injection to late fuel injection as soon as the storage tank 5 is empty, the storage tank 5 is provided with a fill level sensor 9 which is connected, by means of a signal line 14, to the central control unit 10. When a minimum fill level is reached in the storage tank 5, the fill level sensor 9 transmits a signal to the central control unit 10, whereupon the central control unit 10 supplies, by way of a control line 15, a control signal for changing over the operational control of the electronic control device 6 so as to retard fuel injection. As soon as the storage tank 5 is refilled with a reducing agent, the fill level sensor 9 transmits a corresponding signal, by way of the signal line 14, to the central control unit 10 which thereupon activates the electronic engine control device 6, by way of the control line 15, in such a way that a change-back from late fuel injection to the normal fuel injection timing, as originally set, takes place. In the exhaust gas purification system described, therefore, a reduction of the nitric oxides in the exhaust gas stream is achieved in any case, such reduction being obtained either by exhaust gas treatment by the addition of a reducing agent or by an adjustment of fuel injection timing. In order to indicate the absence of a reducing agent in the storage tank 5 to the driver of the motor vehicle, there is provided in the region of the dashboard of the motor vehicle a visual display 17 which is activated by means of line 16 from the central control unit 10 as a function of the particular signal transmitted by the fill level sensor 9.

The above-described simple monitoring of the reducing agent tank makes it possible to comply with engine emission requirements without the need for great expense, as it permits the diesel engine to operate at all times within the legally required exhaust gas emission limits simply by means of engine control measures.

In order to limit the increased fuel consumption to a relatively short period, the reducing agent tank should be refilled by the driver as quickly as possible. The visual display 17 draws the attention of the driver of the motor vehicle to the need for refilling the reducing agent tank. Should he ignore the need to fill the reducing agent tank for a relatively long period, a further feature according to the invention comes into effect: It is proposed that a time switch, coupled to the fill level sensor, is coupled to the engine electronic control device 6 in such a way that it becomes possible to operate the motor vehicle without reducing agent only for a limited period. After the predetermined timespan has elapsed without a fill-up, the operation of the engine is interrupted so that further operation of the motor vehicle is prevented.

What is claimed is:

1. An exhaust gas purification system for an internal combustion engine, particularly a diesel engine, including an electronic engine control device for timing the fuel injection into said engine, said purification system comprising: means for adding a reducing agent stored in a reducing agent storage tank to said exhaust gas, means for detecting the fill level of said storage tank, a control means connected to said detecting means and to said electronic engine control device and causing said electronic engine control device to retard the timing for the fuel injection when said detecting means senses that said reducing agent storage tank is empty.

2. An exhaust gas purification system according to claim 1, wherein a visual display device is provided to indicate that said storage tank is empty.

3. A method of purifying the exhaust gases of an internal combustion engine which is controlled by controlling the amount and timing of the injection of fuel into the engine comprising the steps of: adding a reducing agent taken from a storage tank to the exhaust gases of said engine so as to reduce the nitric oxide content of said exhaust gases and retarding the injection timing when said tank containing said reducing agent is empty.

* * * * *